US010836423B2

United States Patent
Furukawa et al.

(10) Patent No.: US 10,836,423 B2
(45) Date of Patent: Nov. 17, 2020

(54) ELECTRIC POWER STEERING DEVICE AND CONTROL METHOD OF ELECTRIC POWER STEERING DEVICE

(71) Applicant: Mitsubishi Electric Corporation, Tokyo (JP)

(72) Inventors: Akira Furukawa, Tokyo (JP); Akihiko Mori, Tokyo (JP); Eiji Iwami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 15/751,651

(22) PCT Filed: Oct. 22, 2015

(86) PCT No.: PCT/JP2015/079830
§ 371 (c)(1),
(2) Date: Feb. 9, 2018

(87) PCT Pub. No.: WO2017/068685
PCT Pub. Date: Apr. 27, 2017

(65) Prior Publication Data
US 2018/0237058 A1 Aug. 23, 2018

(51) Int. Cl.
*A01B 69/00* (2006.01)
*B62D 6/00* (2006.01)
(Continued)

(52) U.S. Cl.
CPC ......... *B62D 5/0484* (2013.01); *B62D 5/0403* (2013.01); *B62D 5/0463* (2013.01);
(Continued)

(58) Field of Classification Search
CPC .. B62D 5/0484; B62D 5/0403; B62D 5/0487; B62D 5/0409; B62D 5/0463; H02P 25/22; H02P 6/20
(Continued)

(56) References Cited

U.S. PATENT DOCUMENTS

| 2014/0097776 | A1* | 4/2014 | Hayashi | ............... | H02P 6/20 |
| | | | | | 318/400.21 |
| 2015/0109020 | A1* | 4/2015 | Morino | ................. | G01R 31/42 |
| | | | | | 324/764.01 |
| 2016/0159389 | A1* | 6/2016 | Kuramitsu | ........... | B62D 5/0484 |
| | | | | | 180/446 |

FOREIGN PATENT DOCUMENTS

| JP | 3946994 B2 | 7/2007 |
| JP | 5098454 B2 | 12/2012 |

OTHER PUBLICATIONS

International Search Report for PCT/JP2015/079830, dated Dec. 22, 2015.

* cited by examiner

*Primary Examiner* — Mahmoud S Ismail
(74) *Attorney, Agent, or Firm* — Sughrue Mion, PLLC; Richard C. Turner

(57) ABSTRACT

In an electric power steering device including a controller, which is configured to carry out feedback control for a motor including independent two coil winding groups and being configured to rotate a steering mechanism of a vehicle, when one of the two groups recovers from a failure that has occurred in the one group while control is continued solely by another group due to the failure, the controller resumes cooperative control by the two groups, and when starting the cooperative control, sets target current values of the one group and the another group to values different from a final target current value based on an actual current value or a
(Continued)

target current value of the another group at a time of the recovery, to thereby output respective control amounts for the cooperative control.

8 Claims, 4 Drawing Sheets

(51) Int. Cl.
    *B62D 11/00*         (2006.01)
    *B62D 12/00*         (2006.01)
    *B63G 8/20*           (2006.01)
    *B63H 25/04*         (2006.01)
    *G05D 1/00*          (2006.01)
    *G06F 7/00*           (2006.01)
    *G06F 17/00*         (2019.01)
    *B62D 5/04*          (2006.01)
    *H02H 7/08*          (2006.01)
    *G01R 31/34*         (2020.01)
    *B62D 5/02*          (2006.01)
    *H02P 25/22*         (2006.01)

(52) U.S. Cl.
    CPC .......... *B62D 5/0487* (2013.01); *B62D 5/0409* (2013.01); *H02P 25/22* (2013.01)

(58) Field of Classification Search
    USPC .................. 701/41; 318/400.21; 324/764.01; 180/446
    See application file for complete search history.

ELECTRIC POWER STEERING DEVICE AND CONTROL METHOD OF ELECTRIC POWER STEERING DEVICE

This application is a National Stage of International Application No. PCT/JP2015/079830 filed Oct. 22, 2015, the contents of all of which are incorporated herein by reference in their entirety.

TECHNICAL FIELD

The present invention relates to an electric power steering device including a control system redundantly configured, and more particularly, to an electric power steering device, which is configured to improve steering control performance exerted when one system recovers from a failure, and a method of controlling an electric power steering device.

BACKGROUND ART

There has been known a related-art power steering device including a motor, which includes two sets of stator windings, and a control unit, which includes two inverter circuits capable of independently driving the two sets of windings. This related-art electric power steering device controls the two redundant control systems in cooperation, and continues motor drive by one of the control systems on a normal side when another one of the control systems is in an abnormal state.

Moreover, there also has been known a related-art device, which includes only one inverter circuit, but when detecting a failure, does not suddenly start the control but slowly recovers to target current and rotation at the time of the recovery from this failure (for example, refer to Patent Literature 1). Moreover, there has also been known a related-art device, which is configured to variably change a gain at the time of a recovery from a failure, to thereby gradually increase the gain (for example, refer to Patent Literature 2).

CITATION LIST

Patent Literature

[PTL 1] JP 3946994 B2
[PTL 2] JP 5098454 B2

SUMMARY OF INVENTION

Technical Problem

However, the related art has the following problems.

The related-art structures disclosed in Patent Literatures 1 and 2 function to suppress a sudden change in control at the time of the recovery from the failure, and gradually increase the current to the target current. In a case where such gradual increase control is used in a device including two independent sets of inverter circuits, it is easily conceivable to simply add a method of controlling the related-art device when both of the two sets stop the control.

However, when one control system starts to recover from the failure under the state in which another control system continues the normal control, and the target current of the recovering control system is simply gradually increased, the state in which the currents of the two sets are imbalanced continues for a long period of time. Therefore, there is a fear of imbalance in heat generation. When the imbalance in the heat generation occurs, current limit is liable to be applied due to the heat generation in the one control system, and thus there is a fear of decrease in assist performance.

Imbalance exists in the current between the two inverters having a phase difference of, for example, 30 degrees, and an intended decrease in ripple of a sixth-order component of the electrical angle cannot thus be attained. Moreover, when a rotation sensor is a magnetic resistance device, and an angle error generated by influence of magnetic fields generated by the supplied currents is designed to be canceled between the two sets, the currents are imbalanced, and the intended canceling effect is thus not provided, resulting in a large angle error.

Also when motor windings are arranged so as to be offset from each other between the two sets over 360 degrees, the currents are imbalanced, and an imbalanced exciting force thus occurs due to the imbalance in the currents, resulting in degradation of the ripple. In other words, in the case where the effect of canceling the ripple, the equalization of the electromagnetic exciting forces, and the like are intended to be achieved through the two sets of the inverter circuits or the two sets of the motor windings, even when the target current of the control system to be recovered is simply increased gradually, there is a fear for degradation in steering feeling such as a torque ripple and noise.

The present invention has been made in order to solve the above-mentioned problems of the related-art devices, and has an object to provide an electric power steering device, which includes two independent inverter circuits, and is capable of improving a steering feeling exhibited when cooperative control by two control systems corresponding to sets of motor windings is resumed as a result of recovery from a failure of a first control system constructed of one inverter circuit from a state in which the first control system fails and control only by a second control system constructed of another inverter circuit thus continues, and a method of controlling an electric power steering device.

Solution to Problem

According to one embodiment of the present invention, there is provided an electric power steering device including: a motor, which includes a stator including at least two independent coil winding groups, and is configured to rotate a steering mechanism of a vehicle; a drive control circuit, which is configured to drive the at least two independent coil winding groups of the motor independently of each other; and a controller, which is configured to calculate a control amount through feedback control to output the control amount, to thereby cause the drive control circuit to drive the at least two independent coil winding groups, in which: the at least two independent coil winding groups are controlled independently or in cooperation; the controller includes a failure detector, which is configured to detect a failure of the motor or the drive control circuit; and the controller is configured to: output, when occurrence of a failure in one group out of the at least two independent coil winding groups is detected by the failure detector, a control amount so that control is continued solely by another normal group; resume, when recovery of the one group from the failure is detected by the failure detector during a period in which the control is continued solely by the another group, cooperative control by the one group and the another group; and set, when starting the cooperative control, target current values of the one group and the another group to values different from a final target current value common to the at least two independent coil winding groups so that a sum of an actual current of the one group, which has recovered from the failure, and an actual current of the another group falls within an acceptable change amount based on an actual current value or a target current value of the another group at a time of the recovery from the failure, to thereby output respective control amounts for the cooperative control.

Further, according to one embodiment of the present invention, there is provided a method of controlling an electric power steering device, the electric power steering device including: a motor, which includes a stator including at least two independent coil winding groups, and is configured to rotate a steering mechanism of a vehicle; a drive control circuit, which is configured to drive the at least two independent coil winding groups of the motor independently of each other; and a controller, which is configured to calculate a control amount through feedback control to output the control amount, to thereby cause the drive control circuit to drive the at least two independent coil winding groups, the at least two independent coil winding groups being controlled independently or in cooperation, the method, which is carried out by the controller, including: a failure detection step of detecting a failure of the motor or the drive control circuit; a sole control step of outputting, when occurrence of a failure in one group out of the at least two independent coil winding groups is detected in the failure detection step, a control amount so that control is continued solely by another normal group; a control change step of resuming, when the one group recovers from the failure during a period in which the control is continued solely by the another group, cooperative control by the one group and the another group; and a first cooperative control step of setting, when starting the cooperative control, target current values of the one group and the another group to values different from a final target current value common to the at least two independent coil winding groups so that a sum of an actual current of the one group, which has recovered from the failure, and an actual current of the another group falls within an acceptable change amount based on an actual current value or a target current value of the another group at a time of the recovery from the failure, to thereby output respective control amounts for the cooperative control; and a second cooperative control step of changing, after the cooperative control is started, the target current value of the one group and the target current value of the another group toward the final target current value as time elapses.

Advantageous Effects of Invention

According to the present invention, at the time of the recovery from the failure in the case where the control system for one set of the motor windings fails and the control system for another set of the motor windings continues the control, the cooperative control is carried out so that the sum of currents of both of the sets approaches the final target current value while changing within the acceptable change amount in consideration of the control performance and the steering feeling. As a result, it is possible to provide the electric power steering device and the method of controlling an electric power steering device, which are capable of improving the steering feeling exhibited when the cooperative control by two control systems is resumed.

DESCRIPTION OF EMBODIMENTS

Figure 1:
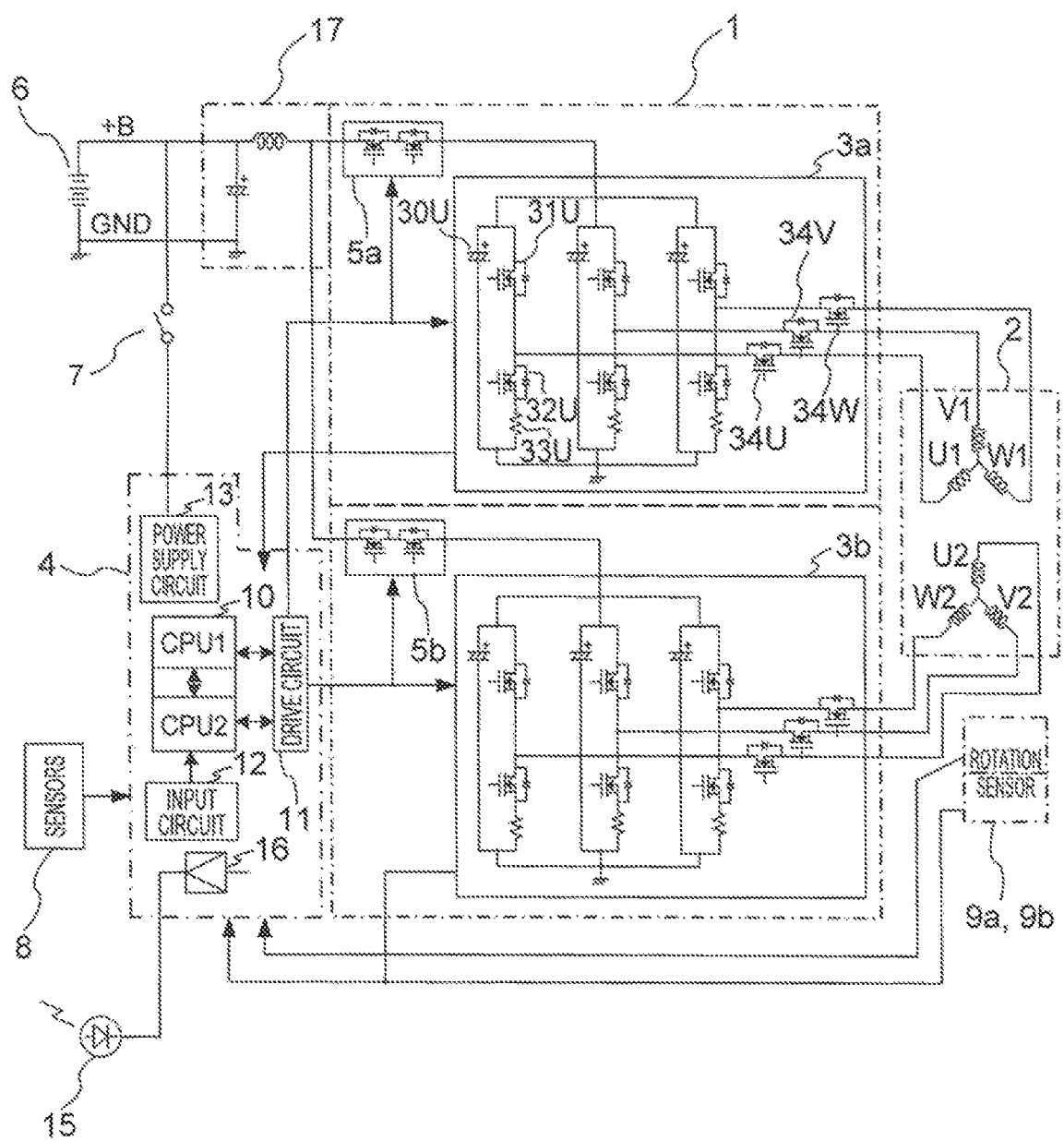
FIG. 1 is a circuit configuration diagram for illustrating an entire electric power steering device according to a first embodiment of the present invention.

Referring to the drawings, a description is now given of an electric power steering device and an electric power steering control method according to preferred embodiments of the present invention.

First Embodiment

FIG. 1 is a circuit configuration diagram for illustrating an entire electric power steering device according to a first embodiment of the present invention. The electric power steering device according to the first embodiment illustrated in FIG. 1 has a configuration in which a control circuit 4, in which a CPU 10 is installed, controls a motor 2 having two sets of three-phase windings via two inverter circuits 3a and 3b, to thereby rotate a steering mechanism of a vehicle.

In this case, the control circuit 4 corresponds to a controller. Moreover, the inverter circuits 3a and 3b and power-supply-relay switching devices 5a and 5b described later are controlled by the controller, and correspond to a drive control unit configured to drive the motor 2.

Power (+B and GND) is supplied to control systems from a battery 6 installed in the vehicle. Then, when an ignition switch 7 is turned on, the power is supplied to the control circuit 4 via a power supply circuit 13. Further, detection information obtained by a torque sensor, which is installed in the vicinity of a steering wheel to detect a steering torque, a speed sensor configured to detect a travel speed of the vehicle, and other sensors is input from sensors 8 to the control circuit 4. A noise filter 17 is also installed on a power supply path (+B and GND).

The detection information from the sensors 8 is transmitted to the CPU 10 via an input circuit 12 of the control circuit 4. The CPU 10 calculates current command values for rotating the motor 2 from the detection information to output the current command values to the drive circuit 11. The drive circuit 11 receives the current command values to output drive signals for driving respective switching devices of the inverter circuits 3a and 3b.

Each of the inverter circuits 3a and 3b includes upper/lower-arm switching devices 31 and 32 for three-phase windings (U, V, and W) of the motor 2, motor-relay switching devices 34, which are configured to carry out connection/disconnection to/from the motor windings, shunt resistors 33, which are configured to detect currents, and noise suppression capacitors 30.

The drive circuit 11 has a function of, when certain abnormality occurs in the control system, stopping the drive of the switching device 31 or 32 of the failed control system, and transmitting error information to the CPU 10.

The windings of the respective phases have the same circuit configurations, and are configured so that currents can independently be supplied to the windings of the respective phases. Moreover, in FIG. 1, the case in which the shunt resistor 33 configured to detect the current is provided downstream of the lower arm switching device 32 is exemplified, but the shunt resistor 33 may be provided in the vicinity of the upper arm switching device 31 or on a power supply line.

Detection information, for example, an electric potential difference between both ends of the shunt resistor 33 and a voltage of a motor winding terminal, is also transmitted to the input circuit 12, and input to the CPU 10. As a result, the CPU 10 calculates a difference between the calculated current value and the detection value to carry out so-called feedback control, to thereby supply desired motor currents to assist a steering force.

Drive signals for the power-supply-relay switching devices 5a and 5b are also output from the drive circuit 11. Thus, the CPU 10 may control the power-supply-relay switching devices 5a and 5b to be brought into an open state, to thereby shut off the current supply to the motor 2.

Similarly, the CPU 10 also has a function of controlling an open/close state of the motor-relay switching devices 34U, 34V, and 34W. Thus, the CPU 10 may control the motor-relay switching devices 34U, 34V, and 34W to be brought into an open state, to thereby independently shut off the respective phases.

The CPU 10 has a failure detection function of detecting failures in the inverter circuits 3a and 3b, the motor windings of the motor 2, and other parts of the control systems from the respective pieces of input information. Further, when detecting a failure, the CPU 10 selectively turns off the motor-relay switching devices 34U, 34V, and 34W in order to shut off, for example, the current supply only to a predetermined phase corresponding to the failure. Moreover, when detecting a failure, the CPU 10 can also selectively turn off the power-supply-relay switching devices 5a and 5b in order to shut off the power supply from the source.

Further, when detecting a failure, the CPU 10 can output a signal to a notification unit 15 via the output circuit 16 so that the notification unit 15 turns on a lamp, for example. The power-source-relay switching devices 5a and 5b may be included in the inverter circuits 3a and 3b, respectively.

The motor 2 is a brushless motor in which the two sets of the windings in the three phases are star-connected. Rotation sensors 9a and 9b are mounted in order to detect a rotation position of a rotor of the brushless motor. Two sensors are mounted as the two rotation sensors 9a and 9b, respectively, in order to secure the redundant systems, and the respective pieces of rotation information obtained by the two sensors are transmitted to the input circuit 12 of the control circuit 4.

Each of the rotation sensors 9a and 9b may be configured, for example, so that a magnet rotor is installed on a rotation shaft end of the motor and a rotation sensor IC is mounted at a position opposing the magnet rotor. Such a configuration in which the rotation sensors 9a and 9b are installed in the vicinity of the motor is essential in order to downsize the device, and it is also necessary to consider a fear that noise caused by the on/off drive of the large currents may affect the detection information.

The motor 2 does not need to be the three-phase brushless motor of the star connection, and may have delta connection, or may be a two bipolar pairs of brushed motors. A winding specification of the motor 2 may be such that a phase difference is provided between the respective sets, or may be so-called multi-phase (six-phase) windings without a phase difference.

As described above, the electric power steering device according to the first embodiment includes two control systems. The two control systems correspond to a first control system configured to use a CPU 1 to control a U1 phase, a V1 phase, and a W1 phase, which are included in a first set of the motor 2 are connected to the inverter 3a, and a second control system configured to use a CPU 2 to control a U2 phase, a V2 phase, and a W2 phase, which are included in a second set of the motor 2 and connected to the inverter 3b. In other words, the control circuit 4 is configured to use the input information, the calculation values, and the detection values independently of each other to independently control the drive of the respective two sets of three phases for the motor 2.

In FIG. 1, the CPU 10 and the drive circuit 11 are illustrated as independent components. However, the electric power steering device may include two CPUs 10 (CPU 1 and CPU 2) and two drive circuits 11 in correspondence to the inverter circuits 3a and 3b, respectively. Moreover, one independent power supply circuit 13 may also be provided to each set of the CPU 10 and the drive circuit 11.

A description is now given of failure detection processing by the CPU 10 in the electric power steering device configured as described above. The CPU 10 is capable of carrying out on/off control for each of the switching devices to compare voltage values of the circuit in the on state and the off state with each other as an initial examination at the time of actuation of the CPU 10, to thereby detect an open failure and a short-circuit failure of the switching device. Moreover, the CPU 10 is also capable of examining absence/presence of a failure of the shunt resistor by supplying a small current at such a degree that the motor 2 does not rotate.

Moreover, during the control, the CPU 10 uses the inverter circuits 3a and 3b to equally control both of the winding groups of the motor 2, and compares the voltages, the currents, the rotation positions, and the like of the winding groups with each other, thereby being capable of detecting abnormality of the respective control systems. When a failure is quickly detected during the control, a determination error may occur. Thus, the CPU 10 often additionally has a timer function of determining that a failure occurs when a failure state continues for a predetermined failure determination period.

However, when the failure determination period is long, the failure may affect other parts, or control performance may quickly degrade during the failure determination period. Thus, it is necessary to consider various conditions in order to determine the failure determination period. Further, even when the failure determination is carried out in consideration of the above-mentioned conditions, the state may return to a normal state after the failure determination in such a state as chattering.

Figure 2:
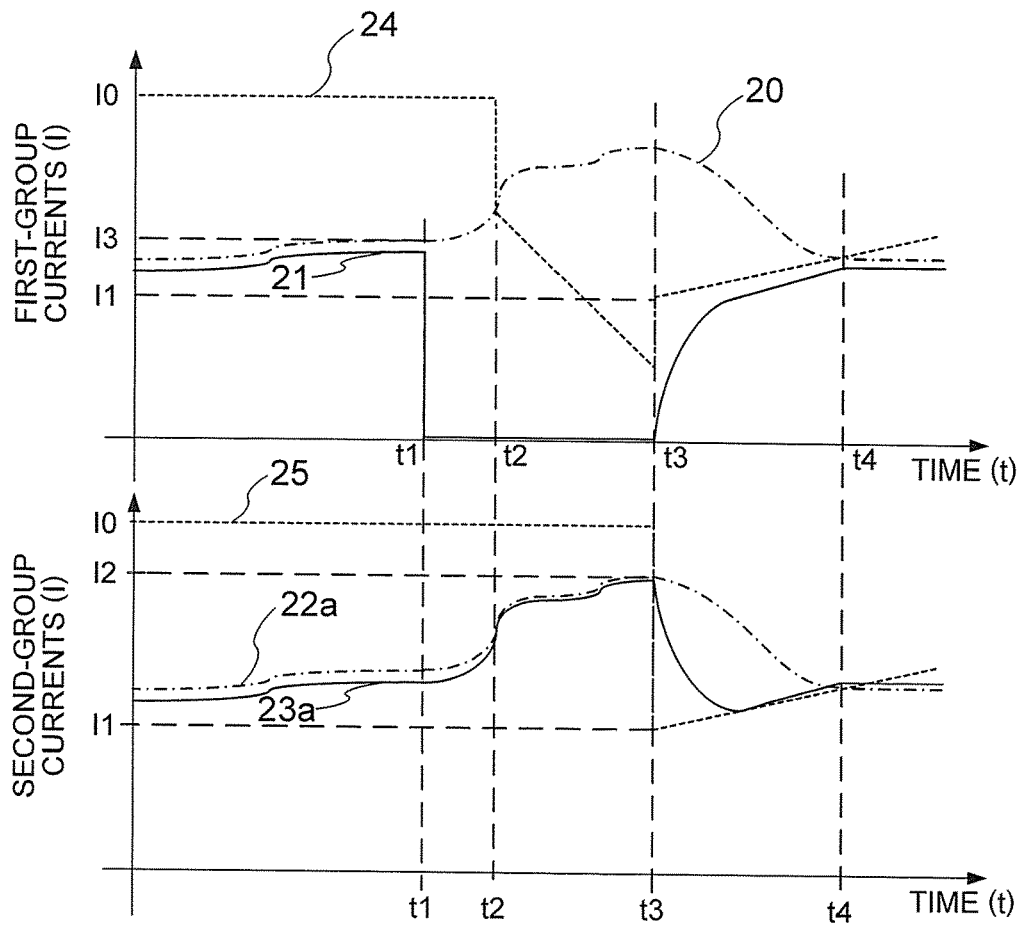
FIG. 2 is a first explanatory graph for showing temporal changes in respective group currents of two control systems in the first embodiment of the present invention.

A case in which the drive circuit 11 detects certain abnormality, and stops the driving of the switching devices 31 or the switching devices 32 is now considered. FIG. 2 is a first explanatory graph for showing temporal changes in respective group currents of the two control systems in the first embodiment of the present invention. A description is herein given while currents relating to the first control system are referred to as "first-group currents", and currents relating to the second control system are referred to as "second-group currents".

The upper part of FIG. 2 is an illustration of respective temporal changes in a target current 20, an actual current 21, and a current limit value 24 in the first control system as the first-group currents. Meanwhile, the lower part of FIG. 2 is an illustration of respective temporal changes in a target current 22a, an actual current 23a, and a current limit value 25 in the second control system as the second-group currents.

Moreover, time points t1 to t4 of FIG. 2 mean the following time points, respectively.

t1: time point at which a failure occurs in the first group t2: time point corresponding to a time point at which a difference between the target current 20 and the actual current 21 exceeds a threshold, and the CPU 10 thus determines that a failure occurs in the first group t3: time point corresponding to a time point at which the CPU 10 determines that the failure occurring in the first group is recovered t4: time point corresponding to a time point at which, as a result of control after the failure recovery, the current limit value 24 reaches the target current 20 in the first group, and the current limit value 25 reaches the target current 22a in the second group Referring to FIG. 2, a detailed description is now be given of the changes in the respective currents of the first group and the second group as the time elapses in respective cases divided in terms of the time point t.

<Behaviors in the Period of "t<t1">

The CPU 10 carries out the normal cooperative control for a case where a failure has not occurred until the time point t1. Thus, the target current 20 of the first group is equal to or smaller than the current limit value 24, and a limited target current is the target current 20. Similarly, the target current 22a of the second group is equal to or smaller than the current limit value 25, and a limited target current is the target current 22a. As a result of the control by the CPU 10, the actual currents 21 and 23a follow the target currents 20 and 22a, respectively, which are the limited target currents.

<Behaviors in the Period of "t1≤t<t2">

When a failure occurs in the first group at the time point t1, the actual current 21 cannot be supplied to the motor 2. As a result, an assist torque by the motor 2 decreases, and when the driver tries to steer as in the way until the time point t1, the steering torque increases, and the CPU 10 carries out output so as to further increase the target current 20.

However, in the period from the time point t1 to the time point t2, the CPU 10 is in a state in which the CPU 10 has not determined that a failure has occurred. The actual current 21 of the first group, in which a failure may have occurred, has suddenly decreased to a value of approximately zero after the time point t1.

Meanwhile, the normal second group operates so that the target current 22a, which serves as the limited target current, increases, and the actual current 23a follows the target current 22a and thus also increases.

<Behaviors in the Period of "t2≤t<t3">

At the time point t2, the difference between the target current 20 and the actual current 21 of the first group is large, and the CPU 10 thus determines that the first group has failed. Then, the CPU 10 determines that a further update of the value of the target current 20 is ineffective, and, for example, gradually decreases the current limit value 24 as the time elapses in the period from t2 to t3.

In FIG. 2, the current limit value 24 is gradually decreased from the limited target current I3 before the failure determination, but may be another limit value, which, for example, gradually decreases from I0, suddenly decreases to a value of approximately zero, or remains to be I0.

<Behaviors in the Period of "t3≤t">

Then, when the CPU 10 determines that the first group has recovered from the failure around the time point t3, the CPU 10 needs to recover the control to the normal control carried out by the two control systems so that both of the groups cooperate with each other to supply the currents to the motor 2. The CPU 10 may use any of values including a voltage or a current of the first group, a signal of the drive circuit 11 for driving the switching devices 31 of the inverter circuit 3b, and the like for the determination of the recovery from the failure.

On this occasion, the target current 22a of the second group is the target current I2 at the time point t3, and the actual current 23a is also approximately equal to I2. Thus, the CPU 10 carries out such a division that the limited target currents for both of the groups are I1, which is approximately half of I2.

Specifically, in the first group, the limited target current is set to any value of from I2 to zero, but when the first group recovers from the failure at the time point t3, the CPU 10 sets the current limit value 24 to I1, and resets the limited target current to I1. Similarly, in the second group, the CPU 10 sets the current limit value 24 to I1, and decreases the limited target current to I1.

After the time point t3, the current limit values reset for both of the groups are gradually increased, to thereby gradually increase the limited target currents toward respective current values required for the steering. The control has continuity in the transient state after the time point t3 at which the state recovers from the failure, and a sudden change in the steering torque can thus be suppressed. Then, the gradually increasing limited target currents reach the target currents at the time point t4.

In the following description, the target currents 20 and 22a at this time point t4 are referred to as "final target current". When the period from the time point t1 to the time point t3 is short, a change in the steering state is assumed to be small. Therefore, the final target current often has a value close to the current I3, which is output before the occurrence of the failure.

Meanwhile, when the period from the time point t1 to the time point t3 is long, the steering state may change before the failure recovery. Thus, the final target current is often a value equal to or larger than half of the current flowing in the normal group immediately before the recovery at the time point t3. In other words, the final target current can be predicted from, for example, state quantities obtained before the failure or immediately before the recovery from the failure.

Figure 3:
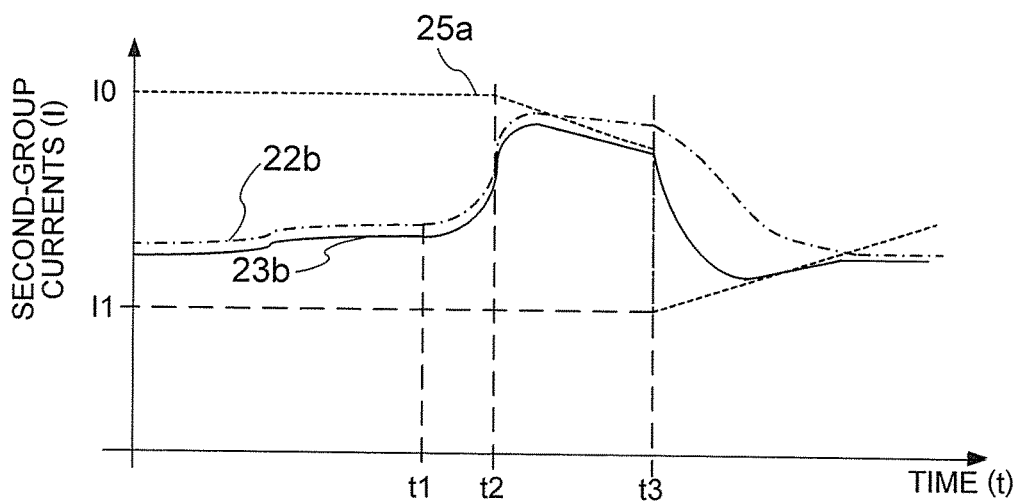
FIG. 3 is a second explanatory graph for showing temporal changes in second-group currents different in control from second-group currents of FIG. 2 in the first embodiment of the present invention.

Referring to FIG. 3, a description is now given of a control state different from the control for the second-group currents illustrated on the lower part of FIG. 2. FIG. 3 is a second explanatory graph for showing temporal changes in the second-group currents different in the control from the second-group currents of FIG. 2 in the first embodiment of the present invention.

It is conceivable to employ the control shown in FIG. 3 for the second-group currents of the second control system in which the failure does not occur. In FIG. 3, after the failure determination at the time point t2, when the control is continued only in the second group on the normal side, it is conceivable that the sufficient control cannot be carried out only by the one group and the current supply may become insufficient. A current limit value 25a of the second group of FIG. 3 is determined in accordance with, for example, acceptable current values of the switching devices, the motor windings, and the like, or a temperature limit due to the heat generation.

Even after the time point t2, the second group continues to supply a large current. Therefore, the current limit value 25a gradually decreases, and a target current value 22b finally becomes the same value as the current limit value 25a. Further, the current limit value 25a becomes a value equal to an actual current value 23b, and this state is illustrated between t2 and t3.

When the state recovers from the failure at the time point t3, the current limit value 25a is reset to an approximately half value, and is then set so as to increase toward the final target current.

Meanwhile, the current limit value 24 of the first group gradually increases again as a result of the current decrease of the second group, and the limited target current gradually increases toward the final target current (refer to FIG. 2).

Even in this state, the limited target current value and the actual current value are approximately equal to each other at the time point t4. In other words, the continuity of the control can be secured by setting an approximately half value of the limited target current value or the actual current value as the limited target current value at the time of the failure recovery.

In the above-mentioned specific example, the limited target current values of both of the groups are reset to the approximately same values. However, the reset value of the first group, which is the failed group, may be set to a value slightly larger than that of the second group on the normal side. Moreover, conversely, the reset value of the first group may be set to a value smaller than that of the second group.

Moreover, the current and the torque are in an approximately proportional relationship to each other. Therefore, irrespective of the magnitude relationship between the reset values of both of the groups, a sum of the actual currents of both of the groups at the time of the recovery is approximately equal to a sum of the actual currents before the recovery. Thus, the recovery to the normal operation can be carried out without a sudden change in the torque.

When the design is made such that a sudden change in the sum of the actual currents does not occur at the time of the reset, a period of a gradual increase thereafter or gradients may also be set independently of each other in the respective groups.

In the first embodiment, the limited target current of the first group is calculated through selection of the minimum value of the target current 20 and the current limit value 24, and the limited target current of the second group is calculated through selection of the minimum value of the target current 22a and the current limit value 25. However, it should be understood that, as long as the limited target current serves in the same way, the same effect is provided even when the respective implications are changed. Thus, in the following description, the target current and the current limit value are not distinguished from each other, and are described as the limited target current.

Figure 4:
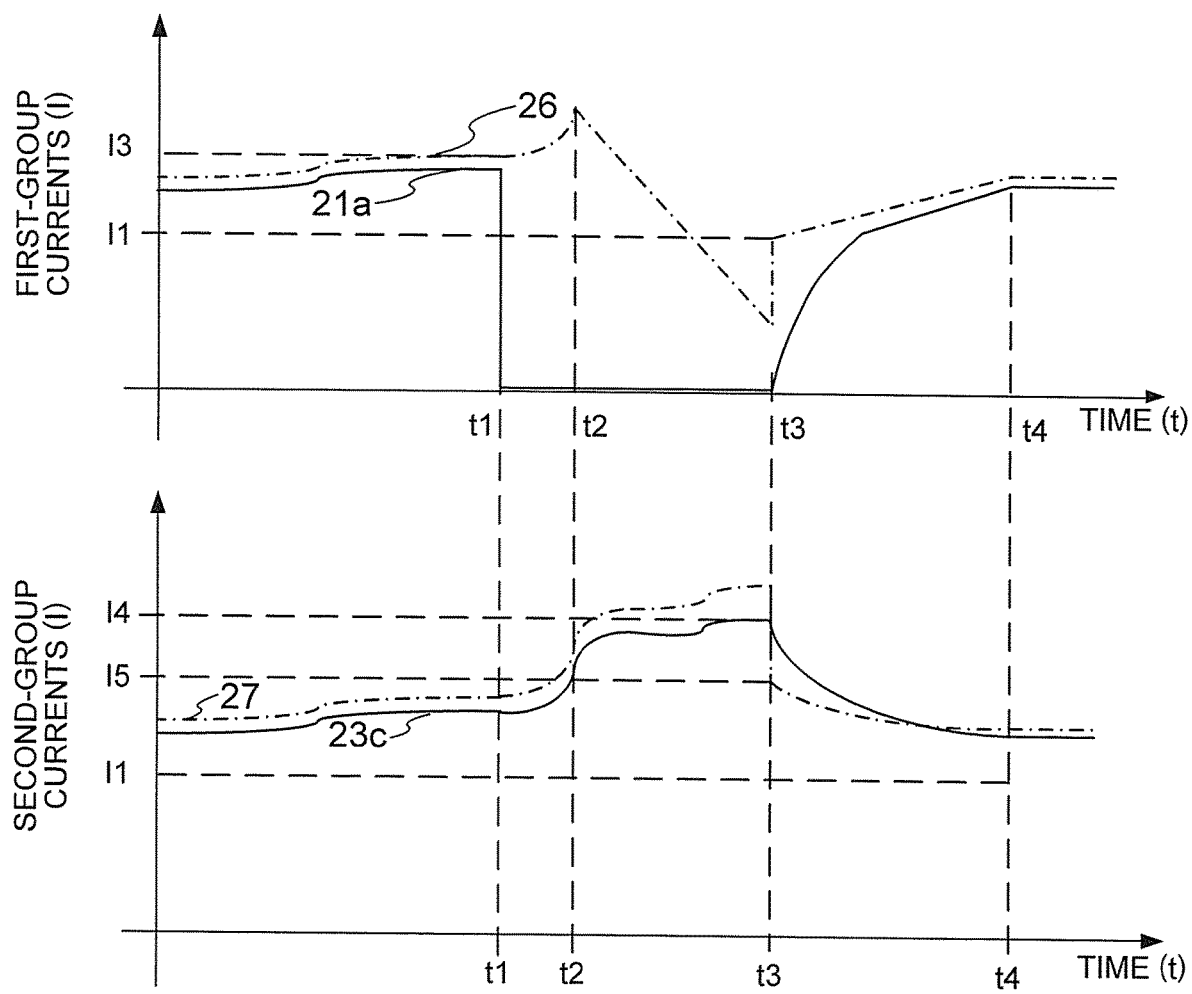
FIG. 4 is a third explanatory graph for showing temporal changes in currents of the respective groups of the two control systems in the first embodiment of the present invention.

Moreover, after the time point t2 at which the failure has occurred, sufficient control cannot be provided only by the second group on the normal side, but it is conceivable to provide control within the current limit value. FIG. 4 is a third explanatory graph for showing temporal changes in respective group currents of the two control systems in the first embodiment of the present invention. In FIG. 4, as the first-group currents, a limited target current 26 and an actual current 21a are illustrated, and, as the second-group currents, a limited target current 27 and an actual current 23c are illustrated.

The first group fails at the time point t1, and the limited target current 26 thus gradually increases while the actual current 21a decreases to a value of approximately zero.

Meanwhile, in the second group on the normal side, the required current needs to be supplied only by this one of the two groups after the time point t1. Therefore, both of the limited target current 27 and the actual current 23c start increasing after the time point t1.

However, the required current cannot be secured only by the one group due to voltage saturation and the like, and a difference occurs between the limited target current 27 and the actual current 23c. On this occasion, a current value I4 is flowing as the actual current. When the first group recovers from the failure at the time point t3, a value approximately half the actual current value I4 of the second group is reset as the target current value I1 in the first group on the failed side.

Meanwhile, the half value may similarly be reset also in the second group. However, when the half value is compared with the final target current value, the half value is smaller, and the actual current value 23c is larger than the final target current value, which is the half value. Therefore, when the final target current value is set to the half value, the current is once decreased, and is then increased. As a result, the smoothness of the control and an ability to reach the target current also degrade.

Thus, in this case, in FIG. 4, the final target current value of the second group is not set to the half value, but to a value between the actual current value and the final current value. When such a setting as gradually changing to the final target value is provided thereafter, there can be provided control of suppressing the torque fluctuation as much as possible. The torque fluctuation at the time of the recovery can be adjusted through the setting of I5, which is the limited target current value at the time point t3. Specifically, when I5 is set to be equal to I1, the torque fluctuation decreases, and when I5 is set to be equal to I4, the torque fluctuation increases.

The limited target current value of the first group may be set to the approximately half value I1 of the actual current value 23c of the second group at the time point t3. Further, after the time point t3, in order to cause the current value to reach the final target current value, the target current value may be set not for the constant gradual increase, but for the steep increase at the beginning, or the control gain may be increased, so that the current value reaches the final target current value earlier.

As described above, the reset value of the limited target current value at the time of the recovery from the failure is appropriately selected in accordance with the control state on the normal side, to thereby secure the subsequent continuous controllability.

More specifically, when the cooperative control is started as a result of recover of the one control system from the failure, based on the actual current value or the target current value of another control system, which has continued the control during the failure, the target current values of the respective control systems are set to the values different from the final target current value so that the sum of the actual currents of both of the control systems falls within the acceptable change amount, and, after the start of the cooperative control, the target current values of the respective control systems are changed toward the final target current value as the time elapses.

As a result, smoothness of the steering torque and the steering feeling is provided, and further, the target current can equally be distributed to the two groups early, and thus thermal balance and canceling effect between the two groups can be obtained. Further, the sudden change in the steering torque at the time of the recovery can be suppressed, which eliminates a sense of discomfort felt by the driver.

Second Embodiment

Figure 5:
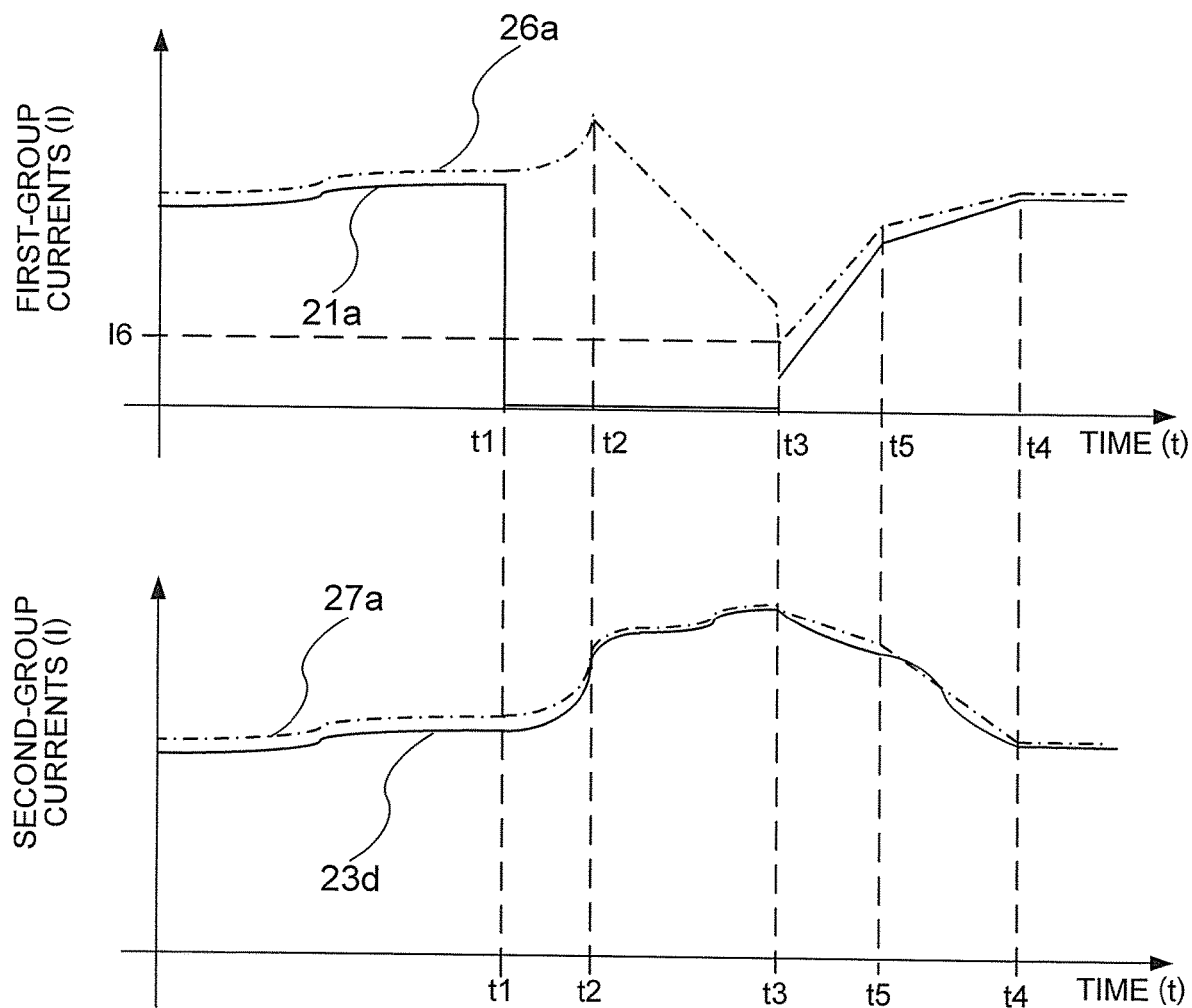
FIG. 5 is an explanatory graph for showing temporal changes in currents of the respective groups of the two control systems in a second embodiment of the present invention.

FIG. 5 is an explanatory graph for showing temporal changes in respective group currents of the two control systems in a second embodiment of the present invention. FIG. 5 is the same as FIG. 2 and FIG. 4 of the first embodiment up to the time point t2.

The second embodiment is different from the first embodiment in the reset of the limited target current values at the time of the recovery from the failure at the time point t3 after the failure is determined at the time point t2 and the control is continued only by the second group.

At the time point t3, the limited target current value of the first group is reset to an intermediate value I6, which is larger than an actual current 21b and smaller than the final target current value. Thereafter, the limited target current value gradually increases toward a time point t5 earlier, and further gradually increases at an amount smaller than the gradual increase rate until the time point t5 toward the time point t4. In other words, the time point t5 is set between the time point t3 and the time point t4, and the limited target current value is reset so as to present the gradual increase on the two stages.

Meanwhile, the second group on the normal side gradually decreases from the time point t3 toward the time point t5, and further gradually decreases from the time point t5 to the time point t4. In the second group, the gradual decrease rates on the two stages from the time point t3 to the time point t5 and from the time point t5 to the time point t3 may be approximately equal, or one may be larger than the other.

Specifically, the gradual increase rate of the limited target current value of the first group side, which recovers from the failure, is set to be larger for earlier recovery, whereas the change in gradual decrease rate of the limited target current value of the normal second group side is set to be smaller. In other words, in the transient state from the time point t3 to the time point t4 until the cooperative control of both of the groups, the limited target current values are set so that the change rate of the one group having a larger difference between the actual current and the final target current value at the time point t3, which is the recovery time point, is larger than that of the other group.

The gradual increase rate or the gradual decrease rate is changed in accordance with the difference between the target current value and the actual current value in this way, thereby being capable of controlling the current value to reach the target current value earlier while the sudden change in the steering torque is suppressed. Moreover, the target current value is often reached earlier in the gradual decrease direction of the current than in the gradual increase direction. Therefore, the absolute value of the gradual increase rate can be set larger than the absolute value of the gradual decrease rate.

Moreover, the target current values reset at the time of the recovery from the failure time may be set not to the target current values different between the failed side and the normal side, but to the same target current values. In this case, in order to increase the gradual increase rate on the failed side, the control amount is increased, or the control gain is increased, thereby being capable of providing the same effect as that in the case where the different target current values are set.

Further, when the first group recovers from the failure in a case where the target current value of the second group on the normal side is in a small current region of a predetermined value or smaller, the difference between the actual current value and the final target current value after the recovery is not large. Thus, in this case, the control may be continued for both of the groups at the same reset values, or the changes in control amounts may be the same. In other words, in the small current region, a sudden change in steering torque after the recovery does not occur, the normal recovery action may thus be carried out, and in a large current region, the gradual increase rate and the gradual decrease rate may be changed.

The invention claimed is:

1. An electric power steering device, comprising:
   a motor, which includes a stator including at least two independent coil winding groups, and is configured to rotate a steering mechanism of a vehicle;
   a drive control circuit, which is configured to drive the at least two independent coil winding groups of the motor independently of each other; and
   a controller, which is configured to calculate a control amount through feedback control to output the control amount, to thereby cause the drive control circuit to drive the at least two independent coil winding groups, wherein:
   the at least two independent coil winding groups are controlled independently or in cooperation;
   the controller includes a failure detector, which is configured to detect a failure of the motor or the drive control circuit; and
   the controller is configured to:
      output, when occurrence of a failure in one group out of the at least two independent coil winding groups is detected by the failure detector, a control amount so that control is continued solely by another normal group;
      resume, when recovery of the one group from the failure is detected by the failure detector during a period in which the control is continued solely by the another group, cooperative control by the one group and the another group; and
      set, when starting the cooperative control, target current values of the one group and the another group to values different from a final target current value common to the at least two independent coil winding groups so that a sum of an actual current of the one group, which has recovered from the failure, and an actual current of the another group falls within an acceptable change amount based on an actual current value or a target current value of the another group at a time of the recovery from the failure, to thereby output respective control amounts for the cooperative control.

2. The electric power steering device according to claim 1, wherein the controller is configured to, at the time of the recovery from the failure:
   set the target current value of the another group to a value equal to or larger than half of the actual current value or the target current value of the another group at the time of the recovery from the failure;
   set the target current value of the one group to a value equal to or smaller than half of the final target current value; and change the target current value of the one group and the target current value of the another group toward the final target current value as time elapses.

3. The electric power steering device according to claim 1, wherein the controller is configured to, at the time of the recovery from the failure:
set the target current value of the another group to a value equal to or smaller than half of the actual current value or the target current value of the another group at the time of the recovery from the failure;
set the target current value of the one group to a value equal to or larger than half of the final target current value; and
change the target current value of the one group and the target current value of the another group toward the final target current value as time elapses.

4. The electric power steering device according to claim 1, wherein the controller is configured to change the target current values or output the control amounts so that the one group, which has recovered from the failure, follows the target current value earlier than the another group when the controller carries out the cooperative control toward the final target current value after the recovery from the failure.

5. The electric power steering device according to claim 2, wherein the controller is configured to change the target current value of the one group so that the target current value gradually increases to the final target current value, and change the target current value of the another group so that the target current value gradually decreases to the final target current value when the actual current value of the another group at the time of the recovery from the failure is equal to or larger than a half value of the final target current value, to thereby carry out the cooperative control.

6. A method of controlling an electric power steering device,
the electric power steering device including:
a motor, which includes a stator including at least two independent coil winding groups, and is configured to rotate a steering mechanism of a vehicle;
a drive control circuit, which is configured to drive the at least two independent coil winding groups of the motor independently of each other; and
a controller, which is configured to calculate a control amount through feedback control to output the control amount, to thereby cause the drive control circuit to drive the at least two independent coil winding groups,
the at least two independent coil winding groups being controlled independently or in cooperation,
the method, which is carried out by the controller, comprising:
a failure detection step of detecting a failure of the motor or the drive control circuit;
a sole control step of outputting, when occurrence of a failure in one group out of the at least two independent coil winding groups is detected in the failure detection step, a control amount so that control is continued solely by another normal group;
a control change step of resuming, when the one group recovers from the failure during a period in which the control is continued solely by the another group, cooperative control by the one group and the another group;
a first cooperative control step of setting, when starting the cooperative control, target current values of the one group and the another group to values different from a final target current value common to the at least two independent coil winding groups so that a sum of an actual current of the one group, which has recovered from the failure, and an actual current of the another group falls within an acceptable change amount based on an actual current value or a target current value of the another group at a time of the recovery from the failure, to thereby output respective control amounts for the cooperative control; and
a second cooperative control step of changing, after the cooperative control is started, the target current value of the one group and the target current value of the another group toward the final target current value as time elapses.

7. The electric power steering device according to claim 3, wherein the controller is configured to change the target current value of the one group so that the target current value gradually increases to the final target current value, and change the target current value of the another group so that the target current value gradually decreases to the final target current value when the actual current value of the another group at the time of the recovery from the failure is equal to or larger than a half value of the final target current value, to thereby carry out the cooperative control.

8. The electric power steering device according to claim 4, wherein the controller is configured to change the target current value of the one group so that the target current value gradually increases to the final target current value, and change the target current value of the another group so that the target current value gradually decreases to the final target current value when the actual current value of the another group at the time of the recovery from the failure is equal to or larger than a half value of the final target current value, to thereby carry out the cooperative control.

* * * * *